W. QUENNEVILLE.
POWER TRANSMITTING MEANS AND CONTROL THEREFOR.
APPLICATION FILED MAY 21, 1918.
1,319,030.
Patented Oct. 14, 1919.
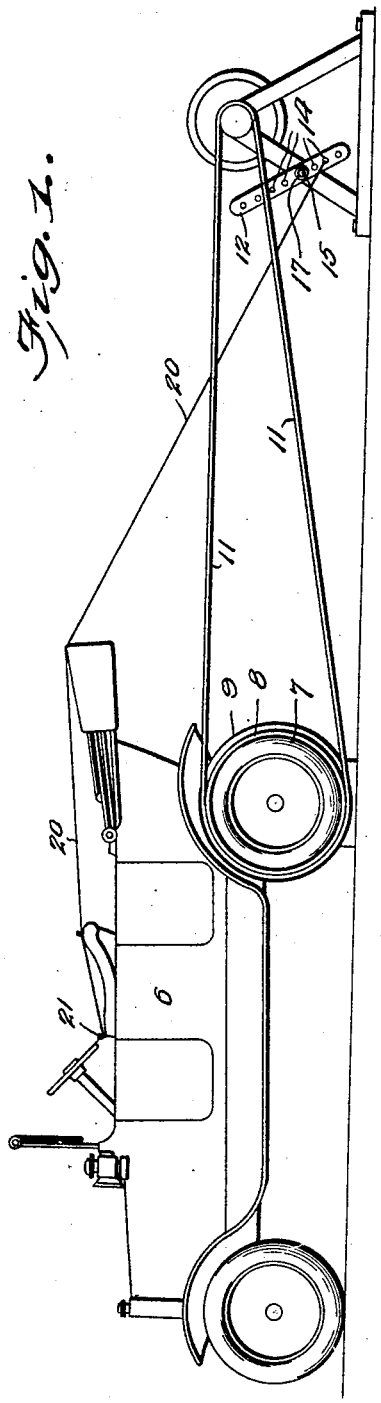
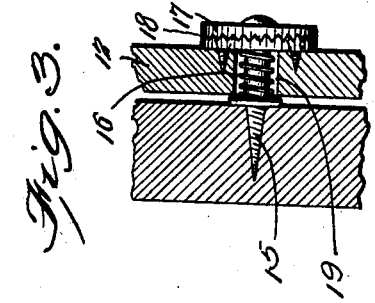
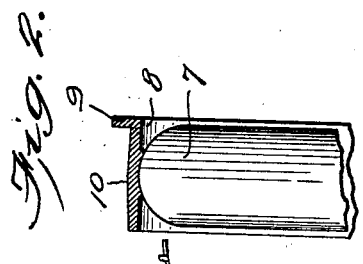
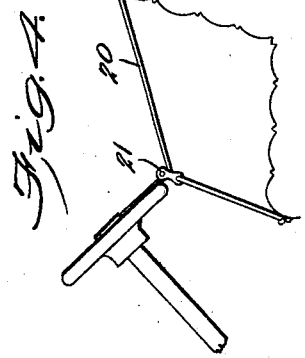
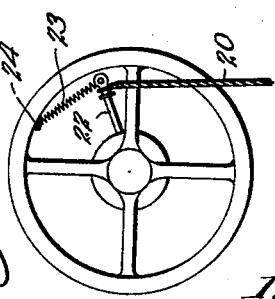
Inventor,
W. Quenneville,
By
E. H. Bond
Atty.

UNITED STATES PATENT OFFICE.

WILFRID QUENNEVILLE, OF MORRISBURG, ONTARIO, CANADA.

POWER-TRANSMITTING MEANS AND CONTROL THEREFOR.

1,319,030. Specification of Letters Patent. Patented Oct. 14, 1919.

Application filed May 21, 1918. Serial No. 235,765.

*To all whom it may concern:*

Be it known that I, WILFRID QUENNE-VILLE, a citizen of the Dominion of Canada, residing at Morrisburg, in the county of Dundas and Province of Ontario, Canada, have invented certain new and useful Improvements in Power-Transmitting Means and Controls Therefor, of which the following is a specification.

This invention relates to a power transmitting means for an automobile and a means for controlling the same at a distance from the vehicle.

The principal object of the invention is to provide a means that may be readily and quickly attached to the rear wheel of an automobile and that the speed of the same may be controlled from the machine being operated.

A further object is to provide a means for controlling the speed and power at a distance from the automobile that can be readily and quickly set up and dismantled.

With these and other objects in view, the invention consists in the construction, combination and arrangement of parts as will be hereinafter fully described, illustrated in the accompanying drawing, and pointed out in the claim hereunto appended.

Figure 1 shows a side elevation of a motor car having the rear wheels elevated and a band passing around the same and operating another machine.

Fig. 2 is a sectional view of the band-pulley used in connection with the rear wheel, Fig. 3 is a sectional view showing the means for maintaining the control lever in a relatively firm position, Fig. 4 is a sectional view showing the way the flexible connection to the throttle is held in relation to the steering quadrant, and Fig. 5 is a view of the steering quadrant showing the means for controlling the throttle.

Referring to the drawings like numerals designate like parts in the various drawings.

The numeral 6 designates a motor car of any suitable type having the rear wheels elevated or jacked up by any suitable means so as to prevent same from touching the ground.

Mounted around one of the rear wheels 7 is a preferably metallic band-pulley 8 which has a flange 9 on its inner edge, and has its outer periphery elevated as at 10 to hold the band upon the same. In order to attach the band-pulley 8 to the wheel it is only necessary to flatten the tire slightly, mount the same on the tire and then pump up until it expands to fit the inner periphery of the band-pulley. A band 11 passes around the band-pulley and around the pulley-wheel of any piece of machinery desired to be operated.

From the foregoing it will be seen that an ordinary piece of machinery may be operated from the motor car, but in case the operator would wish to add more speed or power to the machine in operation it would be necessary for him to go to the car and adjust the throttle when desired. In order to overcome this difficulty I provide a control lever 12 which is perforated along its entire length with perforations 14 for reasons which will be hereinafter described. The control lever may be fastened to one of the uprights of the machine by a wood screw 15. With reference to Fig. 3, the wood screw is passed through a large opening 16 in the control lever and has its head formed of a notched disk 17, the notches coacting with the notches on the disk 18 fastened to the control lever. A coil spring 19 is mounted around the wood screw 15 inside the opening 16, its purpose being to keep the two disks in close relation to each other. Therefore, when the lever would be put in a desired position it would be normally maintained in such a position by the notches in the disks 17 and 18, the spring keeping the same in close relation to each other.

The perforations 14 are used for fastening a flexible connection 20 thereto. If it is desirous of having a slight pull on the flexible connection, the same may be attached to one of the perforations nearest the wood screw 15, and if a long pull is desired, the same may be attached to one of the perforations on the outer end of the control lever.

The flexible connection is passed over the car and through a pulley 21 which is fastened to the front seat of the motor car, as shown in Fig. 4, the object of the pulley 21 being to hold the flexible connection in a normally level position with the steering quadrant. The end of the flexible connection is securely fastened to the throttle 22 on the steering quadrant. The throttle is held closed by the coil spring 23 which has one end fastened to the handle of the throttle, and the other to a position on the steering quadrant as at 24. The coil spring 23 will keep the throttle closed, and the flexible connection when being operated by the control lever will open the same, and when released, the coil spring 23 will immediately close the same.

It is obvious from the foregoing that a person may be attending to the work at the machine and at the same time be controlling the speed and power of the motor without being close to the same.

From the foregoing it is thought that the construction of my invention will be clearly understood, and therefore a more extended explanation has been omitted.

What I claim as new, is,—

A power transmitting device embodying a support, a control lever fulcrumed on said support, and means adjustably connected with said lever for controlling a throttle, said lever having a plurality of holes, and spring-held interengaging disks for coöperation with said fulcrum.

In testimony whereof I affix my signature in the presence of two witnesses.

WILFRID QUENNEVILLE.

Witnesses:
M. McMillan,
F. McGovern.

Copies of this patent may be obtained for five cents each, by addressing the "Commissioner of Patents, Washington, D. C."